No. 703,856. Patented July 1, 1902.
W. W. TOPLIFF.
DETACHABLE SLEIGH RUNNER.
(Application filed Feb. 5, 1902.)
(No Model.)
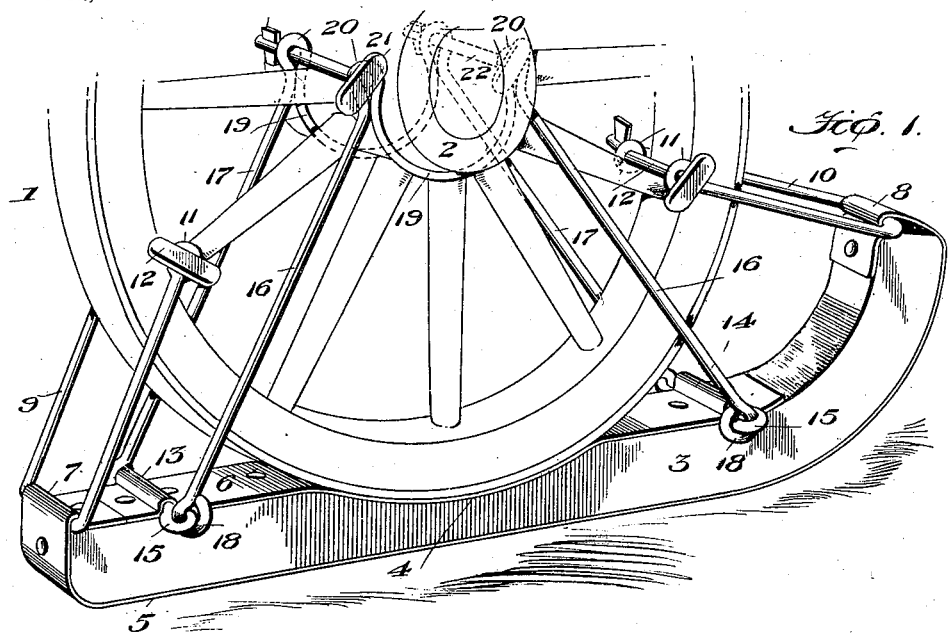
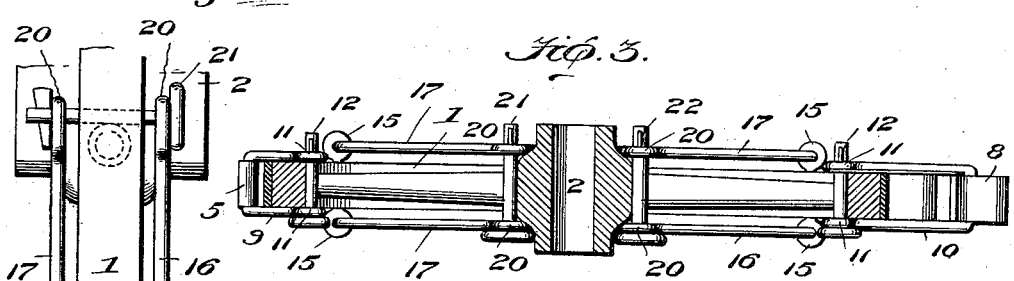
Witnesses
Inventor
Willis W. Topliff
by Henry N. Copp
his Attorney

UNITED STATES PATENT OFFICE.

WILLIS W. TOPLIFF, OF DEWEYS, MONTANA.

DETACHABLE SLEIGH-RUNNER.

SPECIFICATION forming part of Letters Patent No. 703,856, dated July 1, 1902.

Application filed February 5, 1902. Serial No. 92,637. (No model.)

*To all whom it may concern:*

Be it known that I, WILLIS W. TOPLIFF, a citizen of the United States, residing at Deweys, county of Beaverhead, and State of Montana, have invented certain new and useful Improvements in Detachable Sleigh-Runners, of which the following is a specification.

My invention relates to detachable sleigh-runners.

The object of the invention is the provision of a runner of simple and inexpensive construction which can be rapidly and easily applied to or removed from the wheel of any vehicle without in any manner disturbing the same and when properly positioned rigidly held thereto, so that the vehicle will be converted into a sleigh.

Having the foregoing object in view, as well as others not specifically mentioned, the invention consists of a detachable sleigh-runner comprising certain improved features adapted to coöperate with the vehicle-wheel in a novel manner, as fully set forth hereinafter and recited in the appended claims.

In the accompanying drawings, Figure 1 is a perspective view; Fig. 2, an end elevation; Fig. 3, a top view with the wheel divided horizontally in a diametrical manner; Fig. 4, a detail of one of the key-bolt fastenings, and Fig. 5 a detail of one of the hinge connections for the side braces.

The numeral 1 designates a portion of the wheel of any vehicle, which is provided with the usual hub 2.

The numeral 3 designates a runner having the depressed or cut-out portion 4 on its upper edge for the reception of a portion of the vehicle-wheel to assist in retaining the latter on the runner. The runner is provided with the wear-strip 5 along its bottom edge and at its ends and with the top strip 6. The wear-strip 5 is provided with the loops 7 and 8, while 9 and 10 are end braces which have their intermediate portions swiveled in said loops, so they may be swung upwardly and backwardly from the vehicle-wheel, as desired. These end braces are adapted to straddle the felly of the vehicle-wheel and are provided with eyes 11, through which pass the key-bolts 12, said key-bolts passing over the spokes inside of the felly.

The upper strip 6 is provided with the loops 13 and 14, in which are located the hinge members 15, while 16 and 17 designate side braces having ends hinged to the hinge members at 18, thereby permitting the said side braces to be swung downwardly and away from the wheel, as desired. The upper portions of the side braces have the arched depending portions 19, which are adapted to fit under the hub and around the same, and there are also provided the eyes 20, while 21 and 22 designate key-bolts which pass over the spokes on opposite sides of the hub and through the corresponding eyes 20.

Assuming that it is desired to convert an ordinary wheeled vehicle into a sleigh, by the use of my invention one runner is used for each wheel and applied by throwing down or lowering the hinged side braces and the end braces and seating the wheel in the groove or depressed portion of the runner, after which the side and end braces may be swung up and secured by the key-bolts. This can be done very rapidly and easily, and similarly the bolts can be quickly unfastened and the braces swung down to permit detachment of the runner.

Having thus described my invention, what I claim as new, and desire to secure by Letters Patent, is—

1. A detachable sleigh-runner comprising a runner and a side brace hinged at one end to the runner and adapted for connection at its other end to the wheel of the vehicle and arranged to swing downwardly and outwardly on its hinged connection aforesaid from the plane of the wheel.

2. A detachable sleigh-runner comprising a runner and side braces hinged at one end to the runner and adapted for connection at their other ends to the wheel of the vehicle, said side braces being arranged to swing downwardly on their hinged connections aforesaid in opposite directions from each other on opposite sides of the runner and outwardly from the plane of the wheel.

3. A detachable sleigh-runner comprising a runner, side braces hinged at one end to the runner and located on opposite sides of the vehicle-wheel and adapted to swing downwardly on their hinged connections aforesaid and in opposite directions from each other and outwardly from the plane of the wheel, detachable connections between said braces which extend over the spokes of the wheel, end braces hinged to the runner and adapted to straddle the wheel-felly, and detachable fasteners extending over the spokes of the wheel and connecting the portions of the end braces together.

4. A detachable sleigh-runner comprising a runner, side braces located on opposite sides of the vehicle-wheel and consisting of rods having their end portions hinged to the runner and provided with intermediate bent portions which embrace the hub of the vehicle-wheel, said side braces being adapted to swing downwardly on their hinged connections aforesaid in opposite directions from each other and outwardly from the plane of the wheel, and detachable fastenings connecting the bent portions of the braces over the spokes of the wheel.

In testimony whereof I hereunto affix my signature in presence of two witnesses.

WILLIS W. TOPLIFF.

Witnesses:
W. M. WRIGHT,
A. N. BRUBAKER.